US010953547B2

(12) United States Patent
Hasegawa et al.

(10) Patent No.: US 10,953,547 B2
(45) Date of Patent: Mar. 23, 2021

(54) CONTROL APPARATUS, ROBOT, AND ROBOT SYSTEM

(71) Applicant: Seiko Epson Corporation, Tokyo (JP)

(72) Inventors: Fumiaki Hasegawa, Azumino (JP); Ryuichi Okada, Matsumoto (JP)

(73) Assignee: Seiko Epson Corporation

( * ) Notice: Subject to any disclaimer, the term of this patent is extended or adjusted under 35 U.S.C. 154(b) by 351 days.

(21) Appl. No.: 15/788,054

(22) Filed: Oct. 19, 2017

(65) Prior Publication Data

US 2018/0111270 A1 Apr. 26, 2018

(30) Foreign Application Priority Data

Oct. 24, 2016 (JP) .............................. JP2016-207550

(51) Int. Cl.
 *B25J 9/00* (2006.01)
 *B25J 9/16* (2006.01)
 *B25J 13/08* (2006.01)

(52) U.S. Cl.
CPC .......... *B25J 9/1682* (2013.01); *B25J 9/0087* (2013.01); *B25J 9/1633* (2013.01); *B25J 13/085* (2013.01); *G05B 2219/39109* (2013.01); *G05B 2219/39343* (2013.01); *G05B 2219/45048* (2013.01)

(58) Field of Classification Search
CPC ...... B25J 9/1682; B25J 9/0087; B25J 13/085; B25J 9/1633; G05B 2219/39343; G05B 2219/39109; G05B 2219/45048
See application file for complete search history.

(56) References Cited

U.S. PATENT DOCUMENTS

| 2012/0197438 | A1* | 8/2012 | Ogami .................. B25J 9/1682 |
| | | | 700/258 |
| 2013/0090880 | A1* | 4/2013 | Sato ...................... B25J 9/1692 |
| | | | 702/98 |
| 2016/0263747 | A1* | 9/2016 | Yokoi ................... B25J 9/1692 |

FOREIGN PATENT DOCUMENTS

| JP | 07-043134 U | 2/2010 |
| JP | 2010-023128 A | 2/2010 |
| WO | WO-2014125627 A1 * | 8/2014 ............ B25J 9/0087 |

OTHER PUBLICATIONS

Contact Dynamics and Control Strategy Based on Impedance Matching for Robotic Capture of Non-Cooperative Satellite; ROMANSY, Jun. 14-18, 2004; Yoshida et al (Year: 2004).*
Supplemental for Merriam-Webster Dictionary definition look up (Year: NA).*

* cited by examiner

*Primary Examiner* — Ian Jen
(74) *Attorney, Agent, or Firm* — Harness, Dickey & Pierce, P.L.C.

(57) ABSTRACT

A control apparatus that controls a first robot arm provided with a first force detection part and a second robot arm provided with a second force detection part, includes a processor that configured to move the first robot arm until a target force is detected by the first force detection part and performs impedance control on the second robot arm based on output of the second force detection part in at least a part of a movement period in which the first robot arm is moved.

8 Claims, 12 Drawing Sheets

CONTROL APPARATUS, ROBOT, AND ROBOT SYSTEM

BACKGROUND

1. Technical Field

The present invention relates to a control apparatus, a robot, and a robot system.

2. Related Art

Robots each including a base and a robot arm having a plurality of arms (links) are known. One arm of two adjacent arms of the robot arm is rotatably coupled to the other arm via a joint part, and the arm on the most proximal end side (on the most upstream side) is rotatably coupled to the base via a joint part. The joint parts are driven by motors and the arms rotate by the driving of the joint parts. Further, as an end effector, e.g. a hand or the like is detachably attached to the arm on the most distal end side (on the most downstream side). For example, the robot grasps an object with the hand, moves the object to a predetermined location, and performs predetermined work such as assembly.

Patent Document 1 (JP-A-2010-23128) discloses a dual-arm robot including two robot arms (first robot, second robot). In the robot described in Patent Document 1, work may be performed with a hand of one robot arm grasping one object and a hand of the other robot arm grasping the other object, and the convenience is high.

However, in the robot described in Patent Document 1, the two robot arms are moved (operated) by position control at work, and it is difficult to synchronize the two robot arms with each other. Accordingly, in the case of work requiring synchronization of the two robot arms, there is a problem that the work is difficult to perform or the work takes a long time for completion. Further, lots of time and effort are taken for teaching of the robot.

SUMMARY

An advantage of some aspects of the invention is to solve at least a part of the problems described above, and the invention can be implemented as the following forms or application examples.

A control apparatus according to an aspect of the invention is a control apparatus that controls a first robot arm provided with a first force detection part and a second robot arm provided with a second force detection part, including a control unit that moves the first robot arm until a target force is detected by the first force detection part and performs impedance control on the second robot arm based on output of the second force detection part in at least a part of a movement period in which the first robot arm is moved.

With this configuration, work performed in cooperation or synchronization of the first robot arm and the second robot arm may be quickly and accurately performed. Further, teaching of the first robot arm and the second robot arm may be easily and quickly performed.

In the control apparatus according to the aspect of the invention, it is preferable that the control unit performs the impedance control in an entire of the movement period.

With this configuration, the work performed in cooperation or synchronization of the first robot arm and the second robot arm may be performed more accurately.

In the control apparatus according to the aspect of the invention, it is preferable that the control unit performs control of moving the first robot arm to operate an apparatus using the first robot arm, and performs the impedance control with an object grasped by the second robot arm.

With this configuration, work performed using the apparatus on the object may be quickly and accurately performed.

In the control apparatus according to the aspect of the invention, it is preferable that the control unit controls a robot having the first robot arm and the second robot arm.

With this configuration, the installation space of the robot may be reduced compared to the case where two single-arm robots are used.

In the control apparatus according to the aspect of the invention, it is preferable that the control unit performs vacuum packaging work by cooperatively operating the first robot arm and the second robot arm.

With this configuration, the vacuum packaging work may be quickly and accurately performed.

A robot according to an aspect of the invention includes a first robot arm provided with a first force detection part and a second robot arm provided with a second force detection part and is controlled by the control apparatus according to the aspect of the invention.

With this configuration, work performed in cooperation or synchronization of the first robot arm and the second robot arm may be quickly and accurately performed. Further, teaching of the first robot arm and the second robot arm may be easily and quickly performed.

A robot system according to an aspect of the invention includes the control apparatus according to the aspect of the invention, and the first robot arm provided with the first force detection part and the second robot arm provided with the second force detection part controlled by the control apparatus.

With this configuration, work performed in cooperation or synchronization of the first robot arm and the second robot arm may be quickly and accurately performed. Further, teaching of the first robot arm and the second robot arm may be easily and quickly performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a control apparatus, a robot, and a robot system according to the invention will be explained in detail based on embodiments shown in the accompanying drawings.

Figure 1:
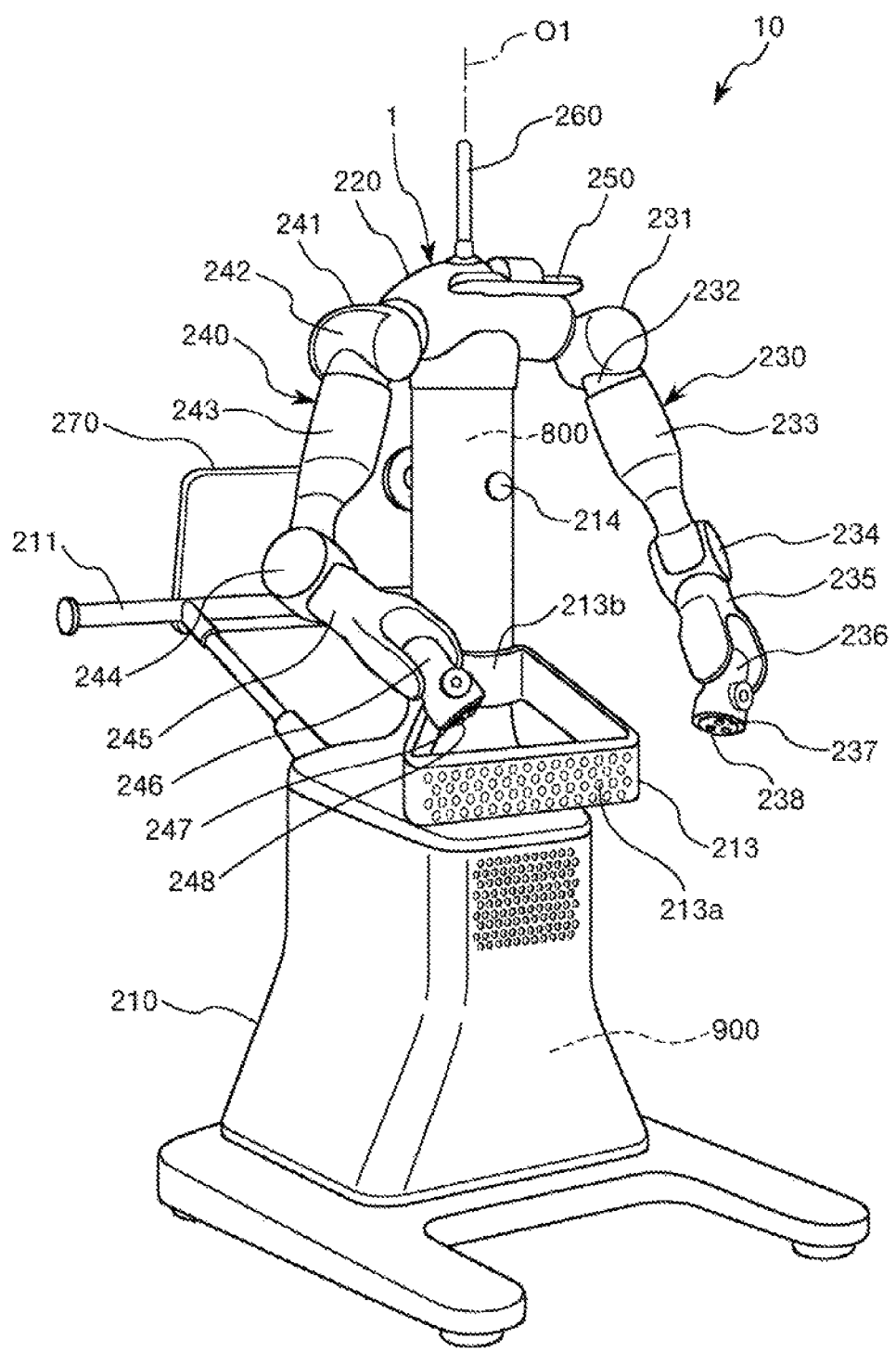
FIG. 1 is a perspective view showing an embodiment of a robot system according to the invention.
Figure 2:
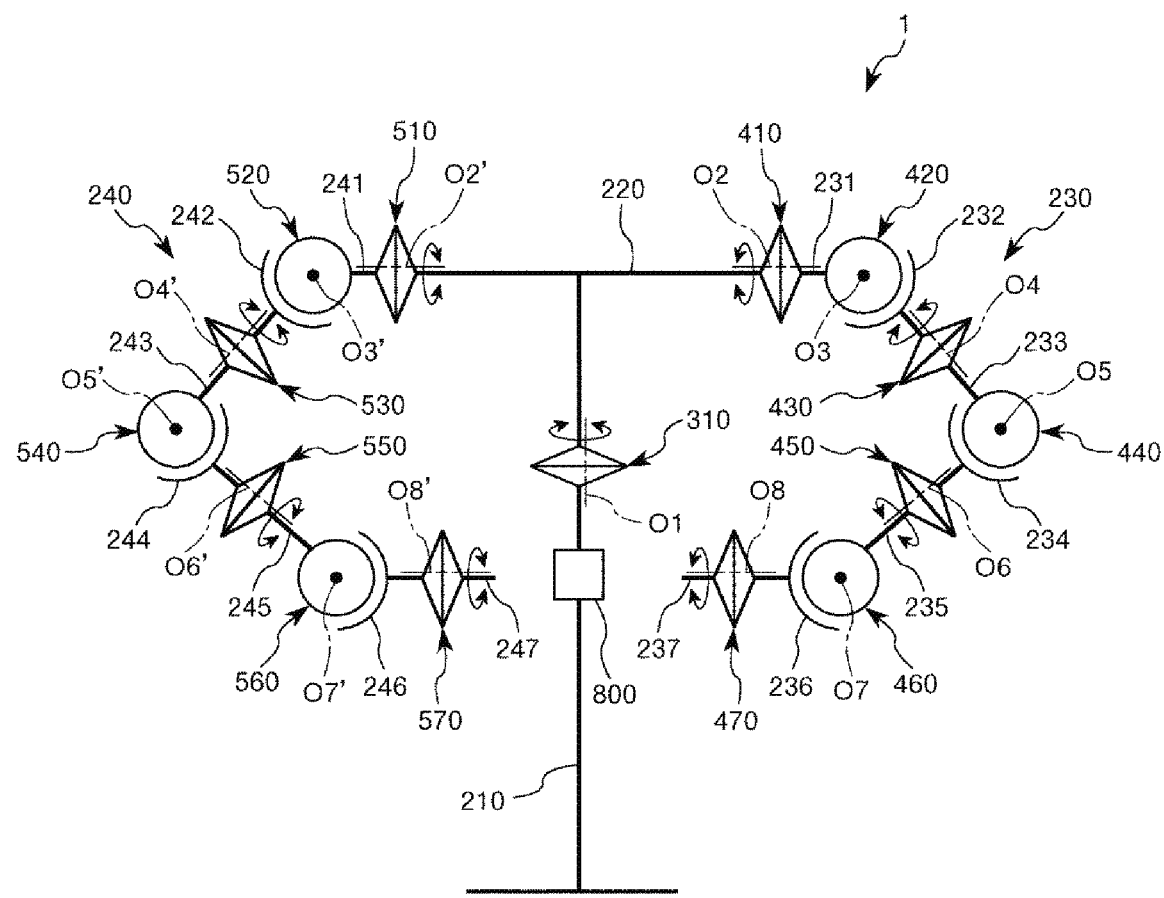
FIG. 2 is a schematic diagram of a robot of the robot system shown in FIG. 1.
Figure 3:
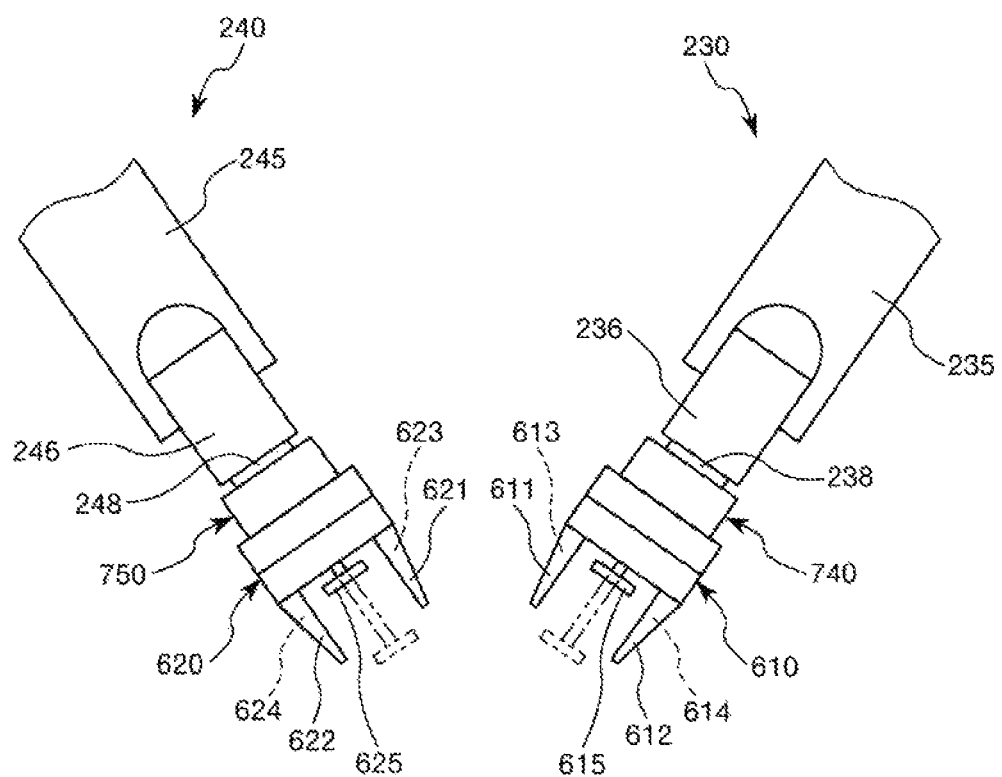
FIG. 3 shows end effectors and force sensors attached to the robot of the robot system shown in FIG. 1.
Figure 4:
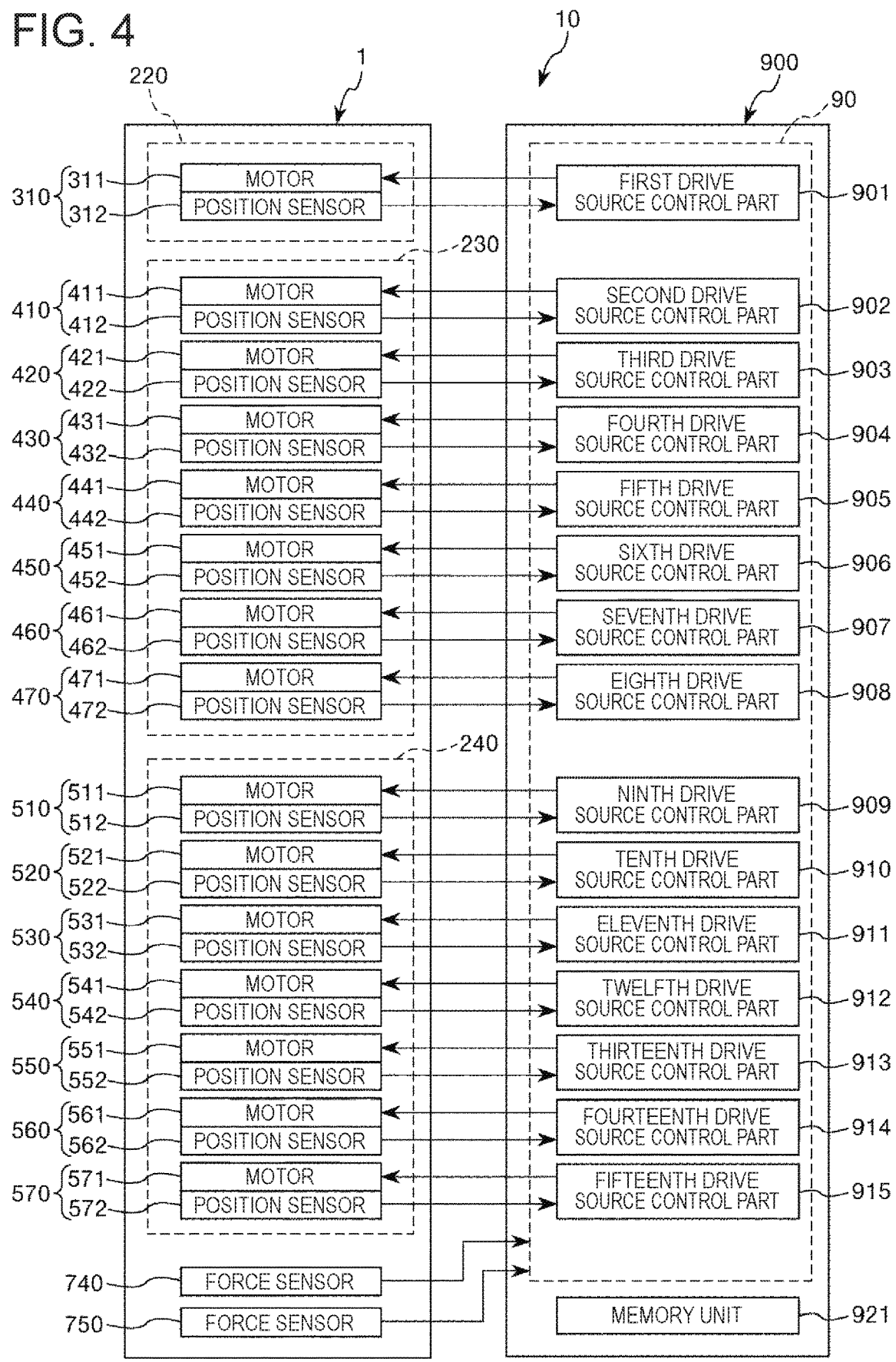
FIG. 4 is a block diagram of a main part of the robot system shown in FIG. 1.
Figure 5:
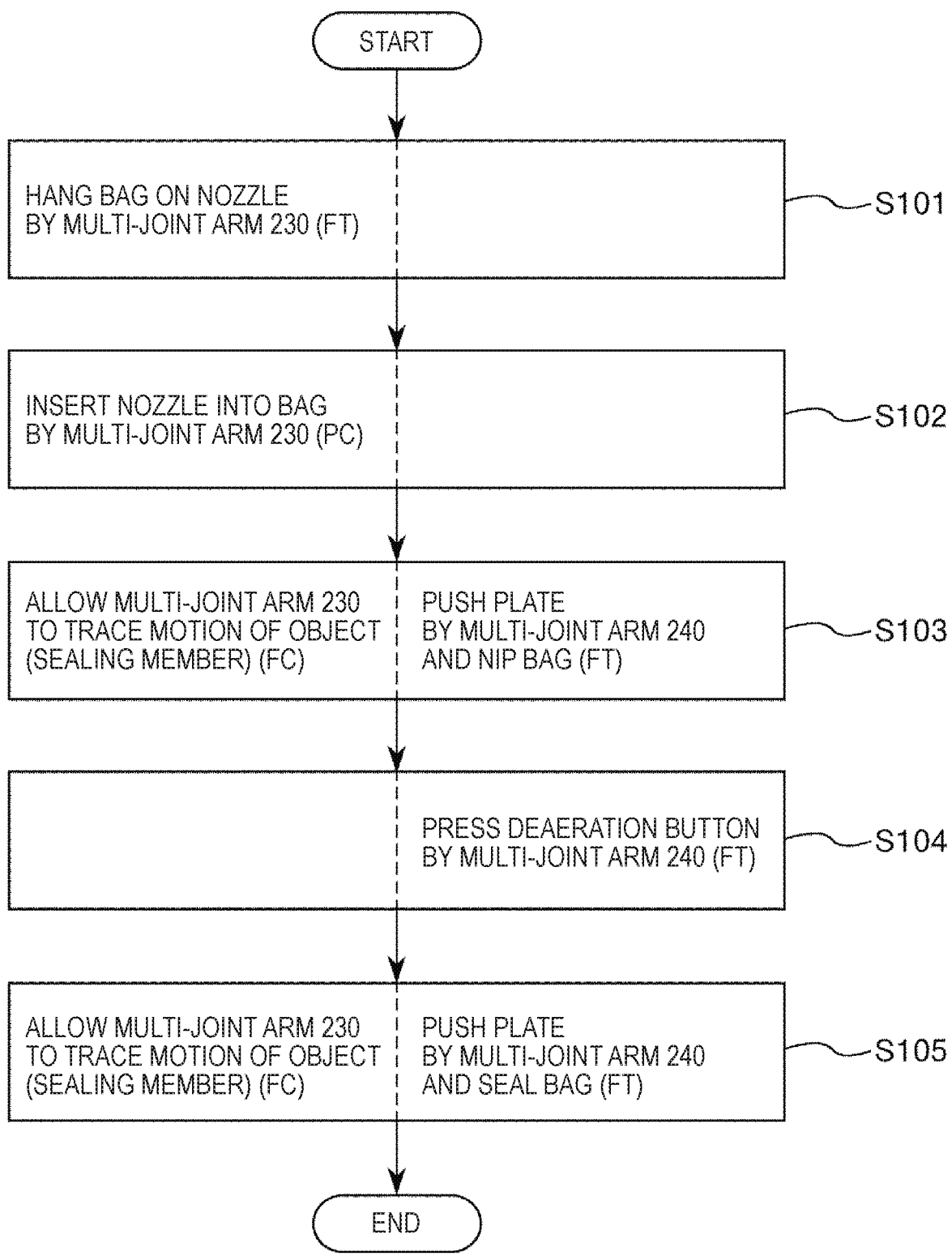
FIG. 5 is a flowchart showing a control operation of a control apparatus of the robot system shown in FIG. 1.

FIG. 1 is a perspective view showing an embodiment of a robot system according to the invention. FIG. 2 is a schematic diagram of a robot of the robot system shown in FIG. 1. FIG. 3 shows end effectors and force sensors attached to the robot of the robot system shown in FIG. 1. FIG. 4 is a block diagram of a main part of the robot system shown in FIG. 1. FIG. 5 is a flowchart showing a control operation of a control apparatus of the robot system shown in FIG. 1. FIGS. 6 to 12 are diagrams for explanation of an operation of the robot of the robot system shown in FIG. 1.

Hereinafter, for convenience of explanation, the upside in FIGS. 1 and 6 to 12 is referred to as "upper" or "above" the downside is referred to as "lower" or "below". The base side in FIGS. 1 and 6 to 12 is referred to as "proximal end" or "upstream" and the opposite side is referred to as "distal end" or "downstream". Further, upward and downward directions in FIGS. 1 and 6 to 12 are referred to as "vertical directions" and leftward and rightward directions are referred to as "horizontal directions". In the specification, "horizontal" includes tilts within a range of 5° or less with respect to the horizontal. Similarly, in the specification, "vertical" includes tilts within a range of 5° or less with respect to the vertical. In FIG. 1, the respective end effectors and the respective force sensors are not shown.

As shown in any one of FIGS. 1 to 4, a robot system 10 includes a control apparatus 900 and a robot 1 controlled by the control apparatus 900 and having a multi-joint arm 240 as an example of a first robot arm provided with a force sensor 750 as an example of a first force detection part and a multi-joint arm 230 as an example of a second robot arm provided with a force sensor 740 as an example of a second force detection part.

The robot 1 includes the multi-joint arm 240 provided with the force sensor 750 (first force detection part) and the multi-joint arm 230 provided with the force sensor 740 (second force detection part), and is controlled by the control apparatus 900. As below, the robot will be specifically explained.

The robot system 10 includes the robot 1 and the control apparatus 900 that controls the robot 1. The robot 1 of the robot system 10 is a dual-arm robot and may be used in a manufacturing process for manufacturing precision apparatuses such as wrist watches and cell phones and components thereof or the like. The dual-arm robot is used as the robot 1, and thereby, the installation space of the robot 1 may be reduced compared to the case where two single-arm robots are used.

A part or all of the control apparatus 900 may be provided inside of the robot 1 or separately provided from the robot 1. In the embodiment, the control apparatus 900 may be provided within a base 210 of the robot 1, which will be described later.

Note that, in the case where the robot 1 and the control apparatus 900 are separately provided, for example, the robot 1 and the control apparatus 900 may be connected by a cable for communications in wired connection or the cable may be omitted for communications in wireless connection.

The control apparatus 900 may be formed by a single unit or a plurality of (two) units. Specifically, for example, the control apparatus 900 may be formed by a first control unit that controls the multi-joint arm 240 etc. of the robot 1, which will be described later, and a second control unit that controls the multi-joint arm 230 etc. of the robot 1, which will be described later. Note that, in the embodiment, the control apparatus 900 is not divided as described above, but formed by a single unit.

The placement of the robot 1 is not particularly limited, however, as below, for convenience of explanation, the case where the robot 1 is placed on a horizontal floor, i.e., the case where a rotation axis O1, which will be described later, is parallel to the vertical direction will be explained as an example.

Robot

As shown in FIG. 1, the robot 1 includes a base 210, a torso 220 coupled to the base 210, a pair of the multi-joint arms 230, 240 as an example of a pair of robot arms coupled to the left and the right of the torso 220, a stereo camera 250 and a signal lamp 260 provided on the torso 220, hand cameras (not shown) provided in the respective multi-joint arms 230, 240, and a monitor 270 provided on the backside of the torso 220.

According to the robot 1 (robot system 10), work may be performed while the positions of parts, tools, etc. on the worktable are confirmed by the stereo camera 250 and the hand cameras. Further, the status of the robot 1, e.g., a drive status, normal stop status, abnormal stop status, etc. may be easily confirmed by the signal lamp 260. Furthermore, information on the robot 1 is displayed on the monitor 270, and thereby, the status of the robot 1 may be readily confirmed. The monitor 270 is e.g. a touch panel, and the display window may be switched, a command may be given to the robot 1, and the given command may be changed by operation of the touch panel.

Base

In the base 210, a plurality of wheels (rotating members) (not shown) that facilitate the movement of the robot 1, a lock mechanism (not shown) that locks the respective wheels, and a handle (grip part) 211 gripped when the robot 1 is moved. The lock mechanism is released and the handle 211 is gripped and pushed and pulled, and thereby, the robot 1 may be freely moved. The wheels are locked by the lock mechanism, and thereby, the robot 1 may be fixed in a predetermined position. As described above, the robot 1 is made movable, and thereby, the convenience of the robot 1 is improved. Note that the wheels, the lock mechanism, and the handle 211 may be respectively omitted.

Further, in the base 210, a bumper 213 for contact with the worktable (not shown) is provided. The bumper 213 is brought into contact with the side surface of the worktable, and thereby, the robot 1 may be opposed to the worktable at a predetermined distance. Accordingly, unintended contact between the robot 1 and the worktable or the like may be prevented. Note that the bumper 213 has a contact portion 213a to be in contact with the worktable and a fixed portion 213b fixed to the base 210 and, in FIG. 1, the bumper is attached to the base 210 so that the contact portion 213a may be located below the fixed portion 213b. The bumper 213 is detachable from the base 210 and the orientation of the bumper 213 may be turned upside down. That is, inversely to FIG. 1, the bumper 213 may be attached to the base 210 so that the contact portion 213a may be located above the fixed portion 213b. As described above, the height of the contact portion 213a is changed, and thereby, the bumper can be adjusted to worktables having various heights.

Note that the bumper 213 may be fixed to a part that moves upward and downward of an elevation mechanism 800, which will be described later, not to the base 210. Thereby, the bumper 213 integrally moves upward and downward with the torso 220, and the height of the bumper 213 is automatically adjusted by the elevation mechanism 800. Therefore, the highly convenient robot 1 is obtained.

Furthermore, in the base 210, an emergency stop button 214 is provided. In case of emergency, the robot 1 may be brought to an emergency stop by pushing the emergency stop button 214.

Torso

The torso 220 is coupled to be movable upward and downward in the vertical direction (rotation axis O1 direction) with respect to the base 210 via the elevation mechanism (movement mechanism) 800. The configuration of the elevation mechanism 800 is not particularly limited as long as the mechanism may move the torso 220 upward and downward with respect to the base 210. In the embodiment, the elevation mechanism 800 is driven by hand. Note that the elevation mechanism 800 may be automatically driven, and, in this case, the elevation mechanism 800 includes a motor (not shown) as a drive source, a position sensor (not shown) that detects the rotation angle of the motor, etc. Further, the elevation mechanism 800 may have a reducer (not shown) that reduces the rotation speed of the motor.

The torso 220 is coupled rotatably about the rotation axis O1 with respect to the base 210 (elevation mechanism 800) via a joint mechanism 310. The rotation axis O1 extends in the vertical direction. The configuration of the joint mechanism 310 is not particularly limited as long as the mechanism may rotate the torso 220 about the rotation axis O1 with respect to the base 210 (elevation mechanism 800). In the embodiment, as shown in FIG. 4, the joint mechanism has a motor 311 as a drive source, a reducer (not shown) that reduces the rotation speed of the motor 311, and a position sensor 312 that detects the rotation angle of the motor 311. As the motor 311 and the respective motors, which will be described later, e.g. servo motors such as AC servo motors or DC servo motors may be used. As the reducer and the respective reducers, which will be described later, e.g. planetary-gear reducers, harmonic drives (registered trademark), or the like may be used. As the position sensor 312 and the respective position sensors, which will be described later, e.g. encoders, rotary encoders, resolvers, potentiometers, or the like may be used.

Multi-Joint Arms

As shown in FIGS. 1 and 2, the multi-joint arm 230 has a first shoulder part (first arm) 231 coupled to the torso 220 via a joint mechanism 410, a second shoulder part (second arm) 232 coupled to the first shoulder part 231 via a joint mechanism 420, an upper arm part (third arm) 233 coupled to the distal end of the second shoulder part 232 via a twist mechanism 430, a first forearm part (fourth arm) 234 coupled to the distal end of the upper arm part 233 via a joint mechanism 440, a second forearm part (fifth arm) 235 coupled to the distal end of the first forearm part 234 via a twist mechanism 450, a wrist part (sixth arm) 236 coupled to the distal end of the second forearm part 235 via a joint mechanism 460, and a coupling part (seventh arm) 237 coupled to the distal end of the wrist part 236 via a twist mechanism 470. Further, a hand part 238 is provided in the coupling part 237, and an end effector 610 according to work to be executed by the robot 1 is detachably attached to the hand part 238 via the force sensor 740 as shown in FIG. 3.

As shown in FIG. 2, the joint mechanism 410 rotates the first shoulder part 231 about a rotation axis O2 orthogonal to a rotation axis O1 with respect to the torso 220. The joint mechanism 420 rotates the second shoulder part 232 about a rotation axis O3 orthogonal to the rotation axis O2 with respect to the first shoulder part 231. The twist mechanism 430 rotates (twists) the upper arm part 233 about a rotation axis O4 orthogonal to the rotation axis O3 with respect to the second shoulder part 232. The joint mechanism 440 rotates the first forearm part 234 about a rotation axis O5 orthogonal to the rotation axis O4 with respect to the upper arm part 233. The twist mechanism 450 rotates (twists) the second forearm part 235 about a rotation axis O6 orthogonal to the rotation axis O5 with respect to the first forearm part 234. The joint mechanism 460 rotates the wrist part 236 about a rotation axis O7 orthogonal to the rotation axis O6 with respect to the second forearm part 235. The twist mechanism 470 rotates (twists) the coupling part 237 about a rotation axis O8 orthogonal to the rotation axis O7 with respect to the wrist part 236. According to the multi-joint arm 230, bending and stretching of the joints (shoulder, elbow, wrist) and twisting of the upper arm and the forearm may be realized like a human arm part by the relatively simple configurations.

The respective configurations of the joint mechanism 410, the joint mechanism 420, the twist mechanism 430, the joint mechanism 440, the twist mechanism 450, the joint mechanism 460, and the twist mechanism 470 are not particularly limited, however, in the embodiment, the same configuration as that of the above described joint mechanism 310. That is, as shown in FIG. 4, the joint mechanism 410 has a motor 411 as a drive source, a reducer (not shown) that reduces the rotation speed of the motor 411, and a position sensor 412 that detects the rotation angle of the motor 411. The joint mechanism 420 has a motor 421 as a drive source, a reducer (not shown) that reduces the rotation speed of the motor 421, and a position sensor 422 that detects the rotation angle of the motor 421. The twist mechanism 430 has a motor 431 as a drive source, a reducer (not shown) that reduces the rotation speed of the motor 431, and a position sensor 432 that detects the rotation angle of the motor 431. The joint mechanism 440 has a motor 441 as a drive source, a reducer (not shown) that reduces the rotation speed of the motor 441, and a position sensor 442 that detects the rotation angle of the motor 441. The twist mechanism 450 has a motor 451 as a drive source, a reducer (not shown) that reduces the rotation speed of the motor 451, and a position sensor 452 that detects the rotation angle of the motor 451. The joint mechanism 460 has a motor 461 as a drive source, a reducer (not shown) that reduces the rotation speed of the motor 461, and a position sensor 462 that detects the rotation angle of the motor 461. The twist mechanism 470 has a motor 471 as a drive source, a reducer (not shown) that reduces the rotation speed of the motor 471, and a position sensor 472 that detects the rotation angle of the motor 471.

The multi-joint arm 240 has the same configuration as the above described multi-joint arm 230. That is, as shown in FIG. 1, the multi-joint arm 240 has a first shoulder part (first arm) 241 coupled to the torso 220 via a joint mechanism 510, a second shoulder part (second arm) 242 coupled to the first shoulder part 241 via a joint mechanism 520, an upper arm part (third arm) 243 coupled to the distal end of the second shoulder part 242 via a twist mechanism 530, a first forearm part (fourth arm) 244 coupled to the distal end of the upper arm part 243 via a joint mechanism 540, a second forearm part (fifth arm) 245 coupled to the distal end of the first forearm part 244 via a twist mechanism 550, a wrist part (sixth arm) 246 coupled to the distal end of the second forearm part 245 via a joint mechanism 560, and a coupling part (seventh arm) 247 coupled to the distal end of the wrist part 246 via a twist mechanism 570. Further, a hand part 248 is provided in the coupling part 247, and an end effector 620 according to work to be executed by the robot 1 is detachably attached to the hand part 248 via the force sensor 750 as shown in FIG. 3.

As shown in FIG. 2, the joint mechanism 510 rotates the first shoulder part 241 about a rotation axis O2' orthogonal to the rotation axis O1 with respect to the torso 220. The joint mechanism 520 rotates the second shoulder part 242 about a rotation axis O3' orthogonal to the rotation axis O2' with respect to the first shoulder part 241. The twist mechanism 530 rotates (twists) the upper arm part 243 about a rotation axis O4' orthogonal to the rotation axis O3' with respect to the second shoulder part 242. The joint mechanism 540 rotates the first forearm part 244 about a rotation axis O5' orthogonal to the rotation axis O4' with respect to the upper arm part 243. The twist mechanism 550 rotates (twists) the second forearm part 245 about a rotation axis O6' orthogonal to the rotation axis O5' with respect to the first forearm part 244. The joint mechanism 560 rotates the wrist part 246 about a rotation axis O7' orthogonal to the rotation axis O6' with respect to the second forearm part 245. The twist mechanism 570 rotates (twists) the coupling part 247 about a rotation axis O8' orthogonal to the rotation axis O7' with respect to the wrist part 246. According to the multi-joint arm 240, bending and stretching of the joints (shoulder, elbow, wrist) and twisting of the upper arm and the forearm may be realized like a human arm part by the relatively simple configurations.

The respective configurations of the joint mechanism 510, the joint mechanism 520, the twist mechanism 530, the joint mechanism 540, the twist mechanism 550, the joint mechanism 560, and the twist mechanism 570 are not particularly limited, however, in the embodiment, the same configuration as that of the above described joint mechanism 310. That is, as shown in FIG. 4, the joint mechanism 510 has a motor 511 as a drive source, a reducer (not shown) that reduces the rotation speed of the motor 511, and a position sensor 512 that detects the rotation angle of the motor 511. The joint mechanism 520 has a motor 521 as a drive source, a reducer (not shown) that reduces the rotation speed of the motor 521, and a position sensor 522 that detects the rotation angle of the motor 521. The twist mechanism 530 has a motor 531 as a drive source, a reducer (not shown) that reduces the rotation speed of the motor 531, and a position sensor 532 that detects the rotation angle of the motor 531. The joint mechanism 540 has a motor 541 as a drive source, a reducer (not shown) that reduces the rotation speed of the motor 541, and a position sensor 542 that detects the rotation angle of the motor 541. The twist mechanism 550 has a motor 551 as a drive source, a reducer (not shown) that reduces the rotation speed of the motor 551, and a position sensor 552 that detects the rotation angle of the motor 551. The joint mechanism 560 has a motor 561 as a drive source, a reducer (not shown) that reduces the rotation speed of the motor 561, and a position sensor 562 that detects the rotation angle of the motor 561. The twist mechanism 570 has a motor 571 as a drive source, a reducer (not shown) that reduces the rotation speed of the motor 571, and a position sensor 572 that detects the rotation angle of the motor 571.

End Effector

The end effectors 610, 620 attached to the distal ends of the multi-joint arms 230, 240 have functions of grasping objects, for example. The configurations of the end effectors 610, 620 are different depending on the work to execute, however, for example, as shown in FIG. 3, the end effector 610 may have four fingers 611, 612, 613, and 614 and the end effector 620 may have four fingers 621, 622, 623, and 624. In the end effector 610 having the configuration, an object may be grasped by adjustment of predetermined separation distances among the fingers 611 to 614. Similarly, in the end effector 620 having the configuration, an object may be grasped by adjustment of predetermined separation distances among the fingers 621 to 624.

The end effector 620 has a press portion 625 in the center part of the four fingers 621, 622, 623, and 624 as seen from the distal end direction. As shown by two-dashed dotted lines in FIG. 3, the press portion 625 can move in the distal end direction to move to a protrusion position protruding to the more distal end side than the fingers 621, 622, 623, and 624. Further, the press portion 625 can move in the proximal end direction to return the basic position shown in FIG. 3. The end effector 610 also has a press portion 615 like the end effector 620.

Note that the number of fingers of the end effectors 610, 620 is not limited to four, but may be e.g. two, three, or five or more.

As the end effectors 610, 620, not only the end effector having the above described fingers 611, 612, 613, 614, 621, 622, 623, and 624, but may be e.g. an end effector having a configuration of suctioning and grasping an object or a configuration that can grasp an object using a magnet, jig, or the like.

The robot 1 includes the force sensor 740 as an example of a second force detection part that detects a force provided in the multi-joint arm 230 and the force sensor 750 as an example of a first force detection part that detects a force provided in the multi-joint arm 240.

The force sensor 740 placed between the end effector 610 and the hand part 238 and the force sensor 750 placed between the end effector 620 and the hand part 248 have functions of detecting forces applied to the end effectors 610, 620, i.e., functions of detecting forces such as reaction forces received by the end effectors 610, 620 via the grasped object or the like. Note that the force includes moment.

The detection results of the force sensors 740, 750, i.e., the signals output from the force sensors 740, 750 are input to the control apparatus 900, and the control apparatus 900 performs predetermined control based on the detection results of the force sensors 740, 750. The detection results of the force sensors 740, 750 are fed back to the control apparatus 900, and thereby, the robot 1 may execute work more precisely.

The force sensors 740, 750 are not particularly limited, but various sensors may be used, including e.g. six-axis force sensors that detect forces in the respective axes of three axes orthogonal to one another and moment about the respective axes.

Control Apparatus

First, a general configuration of the control apparatus 900 is explained.

The control apparatus 900 controls the multi-joint arm 240 as an example of a first robot arm provided with the force sensor 750 as the example of the first force detection part and the multi-joint arm 230 as an example of a second robot arm provided with the force sensor 740 as the example of the second force detection part.

That is, a control unit 90 of the control apparatus 900 controls the robot 1 having the multi-joint arm 240 (first robot arm) and the multi-joint arm 230 (second robot arm).

The control apparatus 900 includes the control unit 90 that moves the multi-joint arm 240 until a target force is detected by the force sensor 750 and performs impedance control on the multi-joint arm 230 based on the output of the force sensor 740 in at least a part of a period T as a movement period in which the multi-joint arm 240 is moved. Note that the control apparatus 900 is characterized briefly by employing different control methods for the control method of the multi-joint arm 230 and the control method of the multi-joint arm 240 (e.g. impedance control for the former, force trigger control for the latter).

According to the configuration, work performed in cooperation or synchronization of the multi-joint arm 240 and the multi-joint arm 230 may be quickly and accurately performed. Further, teaching of the multi-joint arm 240 and the multi-joint arm 230 may be easily and quickly performed.

In the embodiment, the control unit 90 performs impedance control in the entire of the period T.

Thereby, the work performed in cooperation or synchronization of the multi-joint arm 240 and the multi-joint arm 230 may be performed more accurately. As below, the control apparatus will be specifically explained.

The control apparatus 900 may include a personal computer (PC) containing a CPU (Central Processing Unit), ROM (Read Only Memory), and RAM (Random Access Memory) or the like.

The control apparatus 900 may respectively independently operate (actuate) the torso 220, the multi-joint arms 230, 240, and the end effectors 610, 620. In other words, the control apparatus 900 may independently control the respective motors 311, 411 to 471, 511 to 571 of the respective joint mechanisms 310, 410, 420, 440, 460, 510, 520, 540, 560 and the respective twist mechanisms 430, 450, 470, 530, 550, 570 and the respective motors (not shown) of the end effectors 610, 620 via motor drivers etc. In this case, the control apparatus 900 performs detection using the respective detection parts of the force sensors 740, 750, the position sensors 312, 412 to 472, 512 to 572, and the position sensors etc. (not shown) provided in the end effectors 610, 620, and controls driving (e.g. angular velocities, rotation angles, etc.) of the respective motors 311, 411 to 471, 511 to 571 and the respective motors of the end effectors 610, 620 based on the detection results (output). The control program is stored in advance in a memory unit 921 of the control apparatus 900.

As a specific example, as shown in FIG. 4, the control apparatus 900 includes the control unit 90, the memory unit 921, etc.

The control unit 90 includes e.g. a CPU etc. and controls the respective parts of the robot 1. The control unit 90 includes a first drive source control part 901 that controls driving of the motor 311, a second drive source control part 902 that controls driving of the motor 411, a third drive source control part 903 that controls driving of the motor 421, a fourth drive source control part 904 that controls driving of the motor 431, a fifth drive source control part 905 that controls driving of the motor 441, a sixth drive source control part 906 that controls driving of the motor 451, a seventh drive source control part 907 that controls driving of the motor 461, an eighth drive source control part 908 that controls driving of the motor 471, a ninth drive source control part 909 that controls driving of the motor 511, a tenth drive source control part 910 that controls driving of the motor 521, an eleventh drive control part 911 that controls driving of the motor 531, a twelfth drive control part 912 that controls driving of the motor 541, a thirteenth drive control part 913 that controls driving of the motor 551, a fourteenth drive control part 914 that controls driving of the motor 561, a fifteenth drive control part 915 that controls driving of the motor 571, etc.

Further, the memory unit 921 includes e.g. a memory etc. and stores programs, data, and respective information of the detection results of the respective detection parts for the control apparatus 900 to perform respective control (processing).

Next, work performed by the robot 1 and control performed by the control apparatus 900 in the work will be explained with reference to FIGS. 5 to 10.

In the embodiment, as an example of the work, vacuum packaging work (vacuum sealing work) of grasping an object 6 (first object) with the end effector 610 provided in the distal end portion of the multi-joint arm 230 and performing vacuum packaging on the object 6 is taken, and, as an example of an apparatus, a vacuum packaging apparatus 7 (vacuum sealing apparatus) is taken and explained. In this case, the object 6 is a cartridge including a bag 61 (pack) as a soft container and a product 62 packed in the bag 61. Further, before vacuum packaging of the object 6, one end side of the bag 61 is opened.

Further, the vacuum packaging apparatus 7 includes a nozzle 71, a plate 72 as an operation member, a deaeration button 73, and a pair of sealing members 74, 75 that nip and seal the bag 61. The nozzle 71 is movable to a position in which the nozzle protrudes in front of the vacuum packaging apparatus 7 and a position in which the nozzle is housed inside, and the vacuum packaging apparatus 7 drives an internal pump and suctions air by the nozzle 71. The plate 72 protrudes in front of the vacuum packaging apparatus 7 and is movable in upward and downward directions. The sealing member 74 located on the lower side of the pair of sealing members 74, 75 moves with the plate 72, and the sealing member 75 located on the upper side moves in conjunction with the movement of the plate 72. Note that the vacuum packaging apparatus 7 is adapted to nip the bag 61 with the pair of sealing members 74, 75 and seal the bag 61 by thermal fusion.

The control apparatus 900 controls the operation of the robot 1 by position control, force control, etc. based on the output of the respective position sensors and the force sensors 740, 750, i.e., the detection results of the respective position sensors and the force sensors 740, 750.

The position control (PC) is control for the operation of the robot 1 of moving the object 6 to a target position in a target attitude based on information on a predetermined object grasped by the robot 1, in the embodiment, the position and the attitude of the object 6. In place of the object 6, the distal end portions of the multi-joint arms 230, 240 and the end effectors 610, 620 may be used. The information on the position and the attitude of the object 6 can be obtained based on the output of the respective position sensors, i.e., the detection results of the respective position sensors. Note that the position control is shown by "PC" in the drawing.

Further, the force control is control for the operation of the robot 1 of changing the position and the attitude of the object 6 and pushing and pulling the object 6 based on the output of the force sensors 740, 750, i.e., the detection results of the force sensors 740, 750. The force control includes e.g. impedance control (FC) and force trigger control (FT). Note that the impedance control is shown by "FC" and the force trigger control is shown by "FT" in the drawing.

First, regarding the force trigger control, the case where force trigger control is performed on the multi-joint arm 240 as the example of the first robot arm is explained as an example.

In the force trigger control, detection is performed using the force sensor 750 and the multi-joint arm 240 is moved (including change in attitude), i.e., operated until a predetermined force is detected by the force sensor 750. Note that, in the embodiment, when the multi-joint arm 240 is moved under the force trigger control, the position control is also performed.

Next, regarding the impedance control, the case where impedance control is performed on the multi-joint arm 230 as the example of the second robot arm is explained as an example.

The impedance control includes profile control. First, briefly, in the impedance control, the operation of the multi-joint arm 230 (robot 1) is controlled to maintain the force applied to the distal end portion of the multi-joint arm 230 at a predetermined force as far as possible, i.e., maintain the force in a predetermined direction detected by the force sensor 740 at a target value (including zero) as far as possible. Thereby, for example, when the impedance control is performed on the multi-joint arm 230, the multi-joint arm 230 performs an operation of tracing the predetermined object with the distal end portion or the end effector 610 with respect to the predetermined direction.

More specifically, the model of the impedance control of the robot 1 is expressed by the following equation of motion (1).

$$f(t) = mx'' + cx' + kx \quad (1)$$

In the equation (1), m is a mass, c is a coefficient of viscosity, k is a modulus of elasticity (rigidity), f(t) is a force, x is displacement (position) from a target position. Further, the first derivative of x, i.e., x' corresponds to a velocity, the second derivative of x, i.e., x'' corresponds to an acceleration. As below, m, c, and k will be also simply referred to as "parameters".

In the impedance control, a control system for providing the characteristics of the equation (1) to the distal end portion of the multi-joint arm 230 is formed. That is, control is performed as if the distal end portion of the multi-joint arm 230 had a virtual mass, a virtual coefficient of viscosity, and a virtual modulus of elasticity expressed by the equation (1).

Further, the respective parameters m, c, and k in the equation (1) are not particularly limited, but appropriately set based on various conditions. That is, the respective parameters m, c, and k are set to values convenient for the work performed by the robot 1.

The control unit 90 of the control apparatus 900 controls the multi-joint arm 240 and the multi-joint arm 230 to cooperatively operate the multi-joint arm 240 and the multi-joint arm 230, and performs packaging work, particularly, vacuum packaging work. Thereby, the packaging work (vacuum packaging work) may be quickly and accurately performed.

Further, the control unit 90 performs control of moving the multi-joint arm 240 to operate the vacuum packaging apparatus 7 as the example of the apparatus using the multi-joint arm 240, and performs impedance control with the object 6 grasped by the multi-joint arm 230 (to be exact, the end effector 610 attached to the multi-joint arm 230). Thereby, the vacuum packaging work may be quickly and accurately performed.

As below, specifically, the vacuum packaging work performed by the robot 1 and the control performed by the control apparatus 900 in the vacuum packaging work will be explained.

Figure 6:
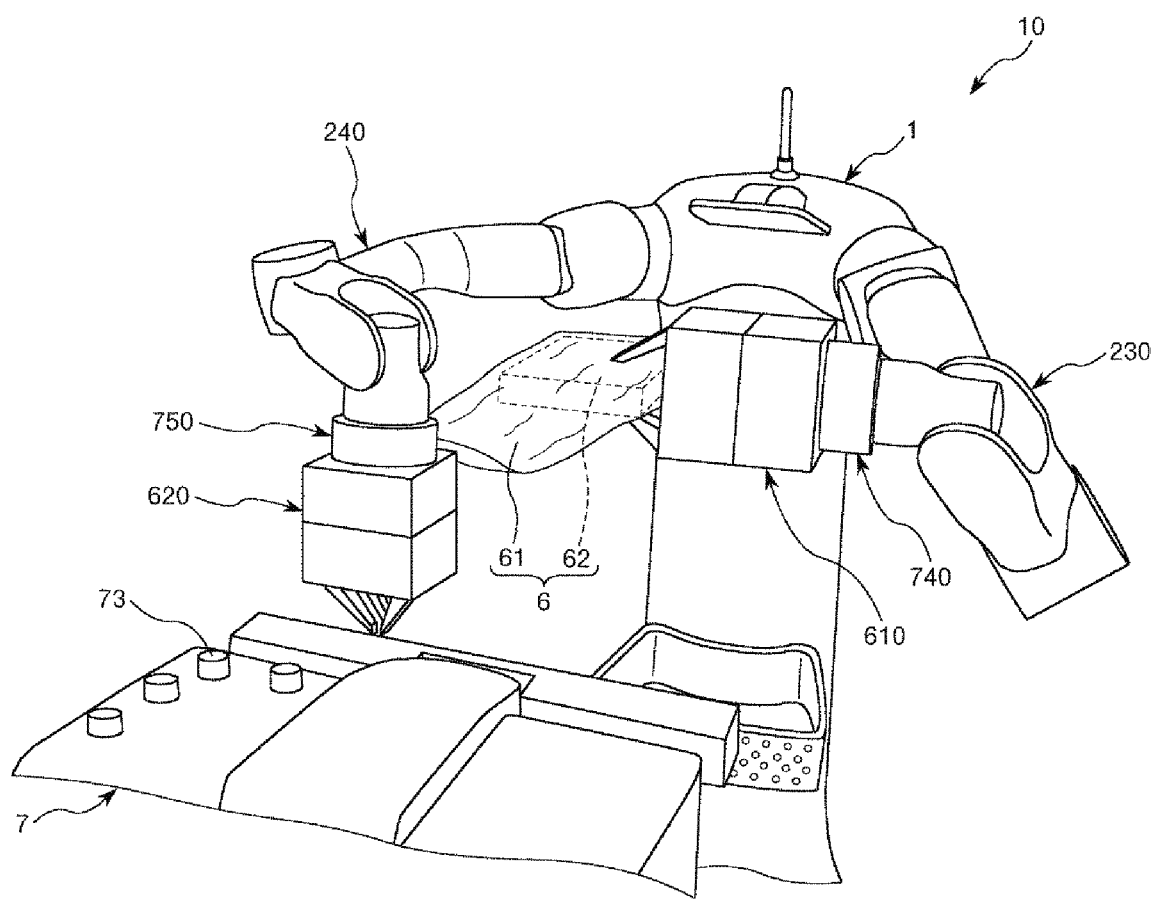
FIG. 6 is a diagram for explanation of an operation of the robot of the robot system shown in FIG. 1.
Figure 7:
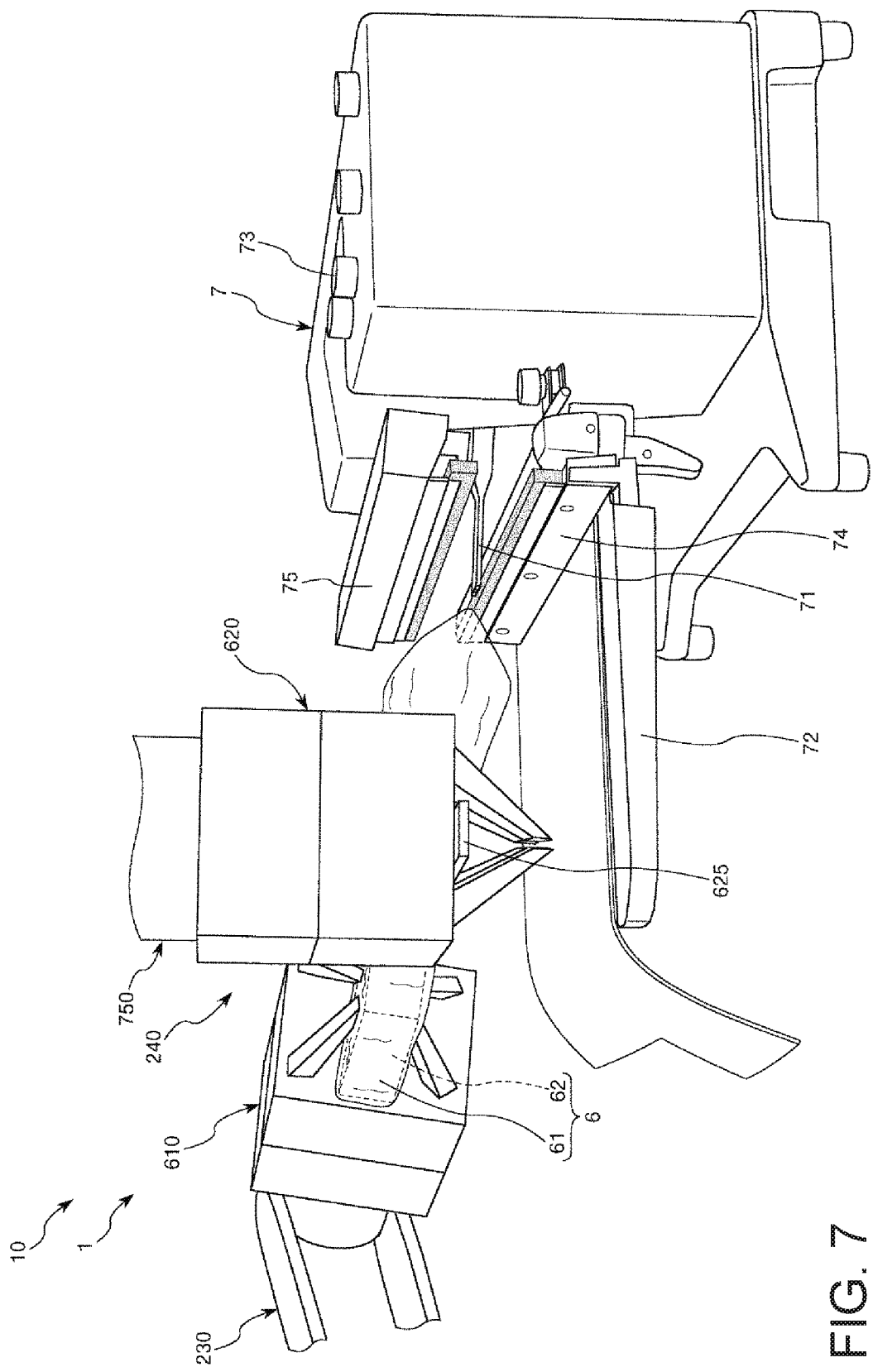
FIG. 7 is a diagram for explanation of the operation of the robot of the robot system shown in FIG. 1.

First, as shown in FIG. 6, under control of the control apparatus 900 (in the following description, the words will be omitted), the robot 1 grasps the object 6 using the end effector 610. Then, as shown in FIG. 7, the object 6 is moved in front of the pair of sealing members 74, 75 of the vacuum packaging apparatus 7 using the multi-joint arm 230. The operation of moving the object 6 in front of the vacuum packaging apparatus 7 is controlled by the position control.

Figure 8:
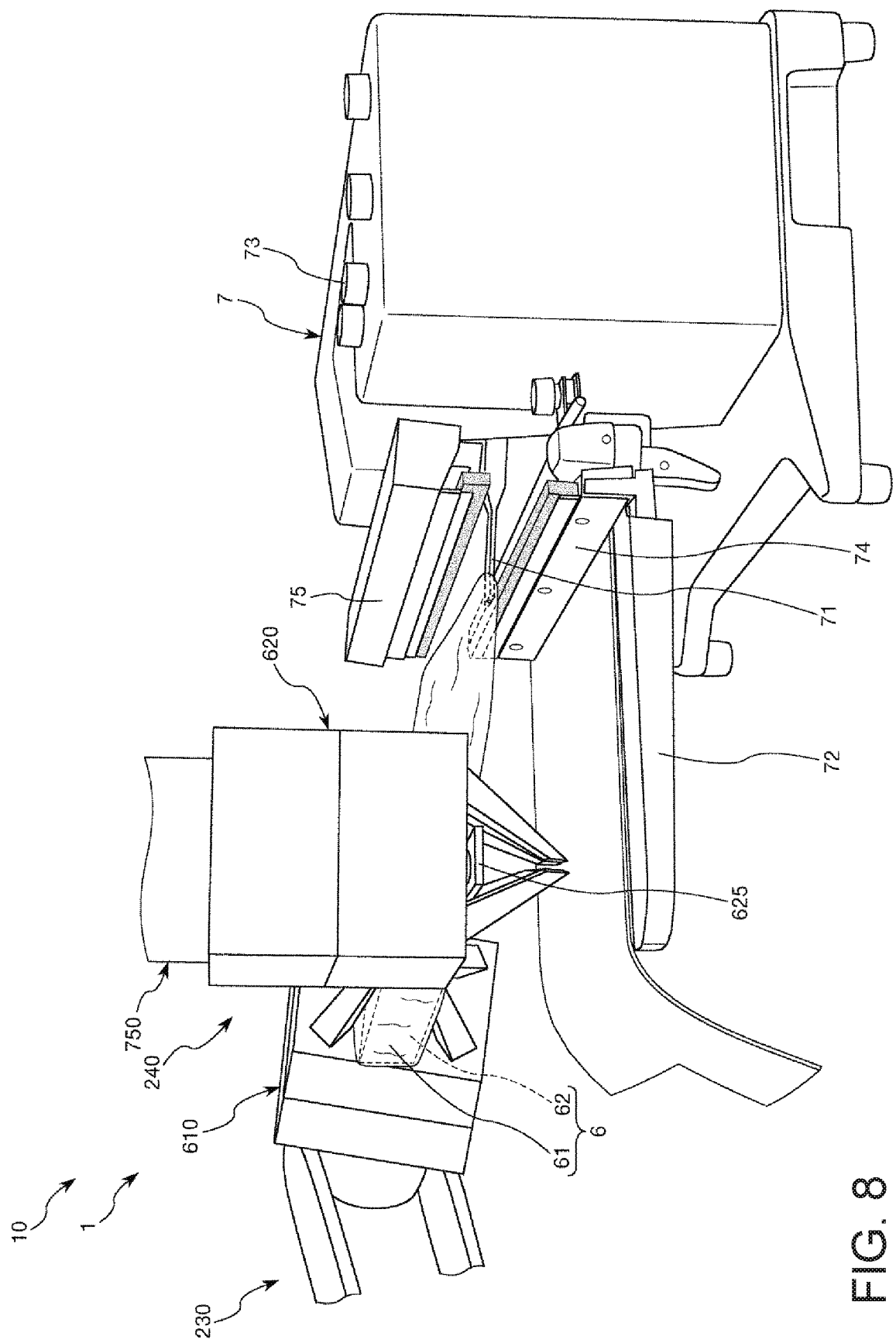
FIG. 8 is a diagram for explanation of the operation of the robot of the robot system shown in FIG. 1.

Then, as shown in FIG. 8, the bag 61 of the object 6 is hung and stretched on the distal end portion of the nozzle 71 of the vacuum packaging apparatus 7 by the multi-joint arm 230 (step S101). In this case, the bag 61 is moved in the horizontal direction so that the bag 61 may be stretched with the distal end portion of the nozzle 71 inserted in the bag 61. Thereby, the nozzle 71 is easily inserted into the bag 61. The operation of hanging and stretching the bag 61 on the nozzle 71 is controlled by the force trigger control and the position control. In the force trigger control, when a preset force is detected by the force sensor 750, the operation of the multi-joint arm 230 is stopped. Then, the multi-joint arm 230 moves to the next operation.

Figure 9:
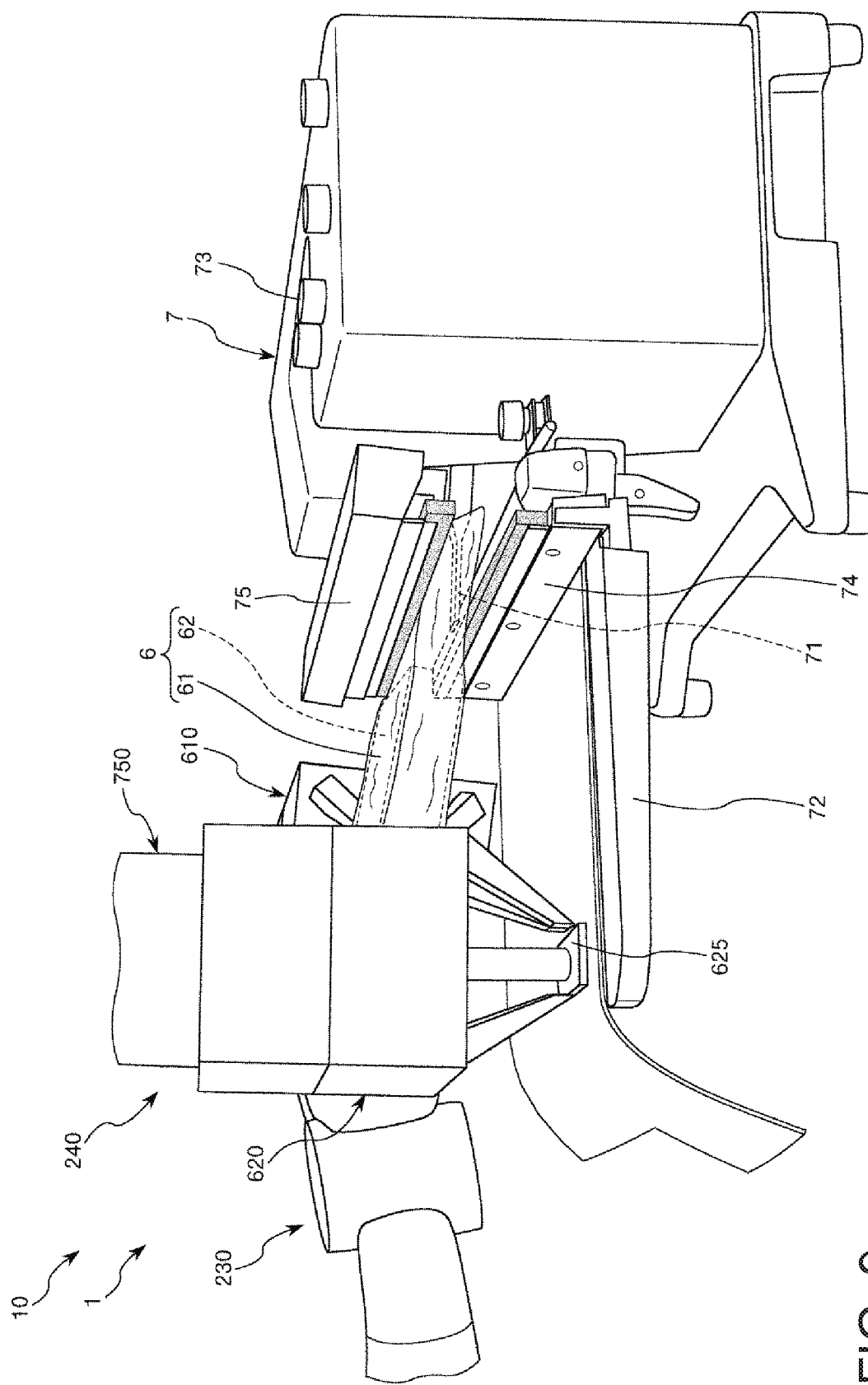
FIG. 9 is a diagram for explanation of the operation of the robot of the robot system shown in FIG. 1.

Then, as shown in FIG. 9, the nozzle 71 is inserted into the bag 61 to a predetermined position by the multi-joint arm 230 (step S102). The operation of inserting the nozzle 71 into the bag 61 is controlled by the position control.

Note that a marker (not shown) is provided in the vacuum packaging apparatus 7, the robot 1 (control apparatus 900) captures the marker using the stereo camera 250, performs position control based on the output, i.e., imaging data of the stereo camera 250, and inserts the nozzle 71 to the predetermined position.

Further, in the end effector 620, the press portion 625 is moved to the protrusion position protruding to the more distal end side than the fingers 621, 622, 623, and 624 in preparation for the next operation.

Figure 10:
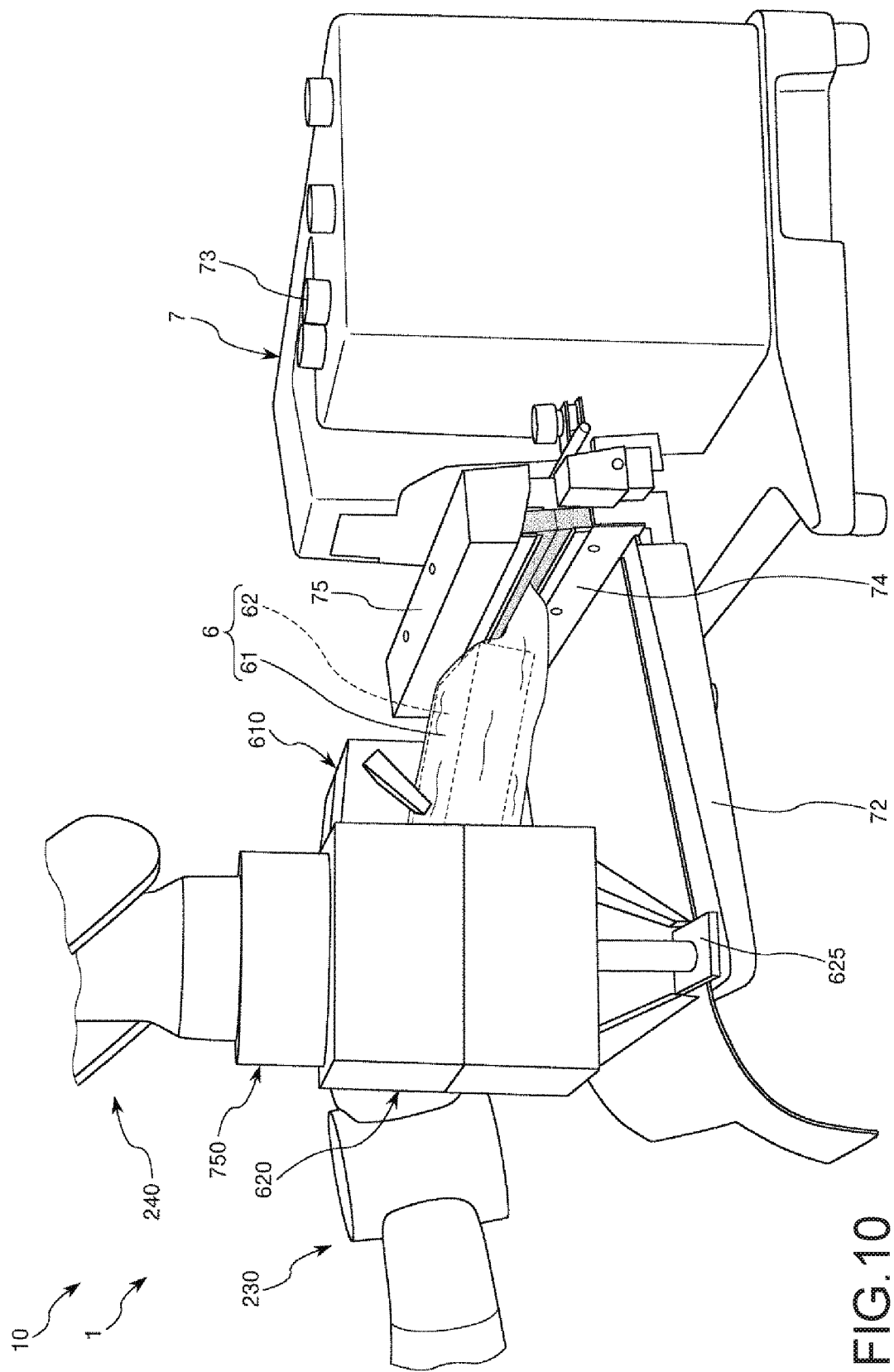
FIG. 10 is a diagram for explanation of the operation of the robot of the robot system shown in FIG. 1.

Then, as shown in FIG. 10, the plate 72 of the vacuum packaging apparatus 7 is pushed below and moved below by the multi-joint arm 240 (step S103). The operation of pushing the plate 72 below is controlled by the force trigger control and the position control. In the force trigger control, when a preset force (target force) is detected by the force sensor 750, the operation of the multi-joint arm 240 is stopped. Then, the multi-joint arm 240 moves to the next operation.

In the vacuum packaging apparatus 7, when the plate 72 moves below, the sealing member 74 moves below with the plate 72. Further, the sealing member 75 moves below by an amount of movement larger than the amount of movement of the sealing member 74, and thereby, the bag 61 is nipped by the sealing member 74 and the sealing member 75. Thereby, the bag 61 is closed. Further, in this regard, the object 6 is subjected to forces from the sealing members 74, 75 and moves forward and backward, upward and downward, or the like.

At step S103, the multi-joint arm 230 is allowed to trace the motion of the object 6 (sealing members 74, 75) (step S103). The operation of allowing the multi-joint arm 230 to trace the motion of the bag 61 is controlled by the impedance control, not the position control. Thereby, the operation may be easily and appropriately performed. Note that, in the embodiment, at step S103, the impedance control is performed after the start and before the end of the movement of the multi-joint arm 240, i.e., in the entire of the period T1 in which the multi-joint arm 240 is moved, however, may be performed in a part of the period T1.

Figure 11:
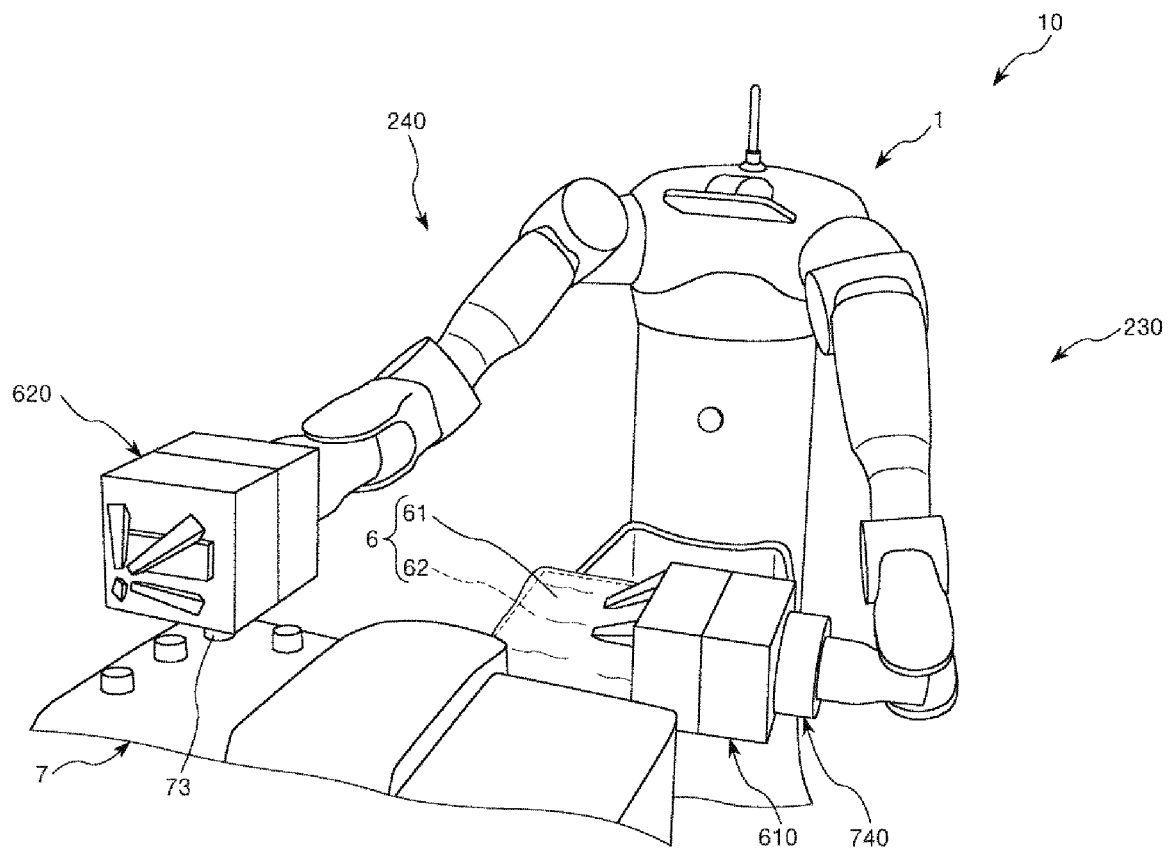
FIG. 11 is a diagram for explanation of the operation of the robot of the robot system shown in FIG. 1.

Then, as shown in FIG. 11, the deaeration button 73 of the vacuum packaging apparatus 7 is pressed by the multi-joint arm 240 (step S104). Thereby, the air within the bag 61 is suctioned by the nozzle 71 and the interior of the bag 61 is decompressed. The operation of pressing the deaeration button 73 is controlled by the force trigger control and the position control. In the force trigger control, when a preset force is detected by the force sensor 750, the operation of the multi-joint arm 240 is stopped. Then, the multi-joint arm 240 moves to the next operation.

In the vacuum packaging apparatus 7, the pressure within the bag 61 is detected and, when the pressure within the bag 61 takes a preset value (deaeration within the bag 61 is completed), the nozzle 71 moves into the vacuum packaging apparatus 7. That is, the nozzle 71 moves from inside to the outside of the bag 61.

Figure 12:
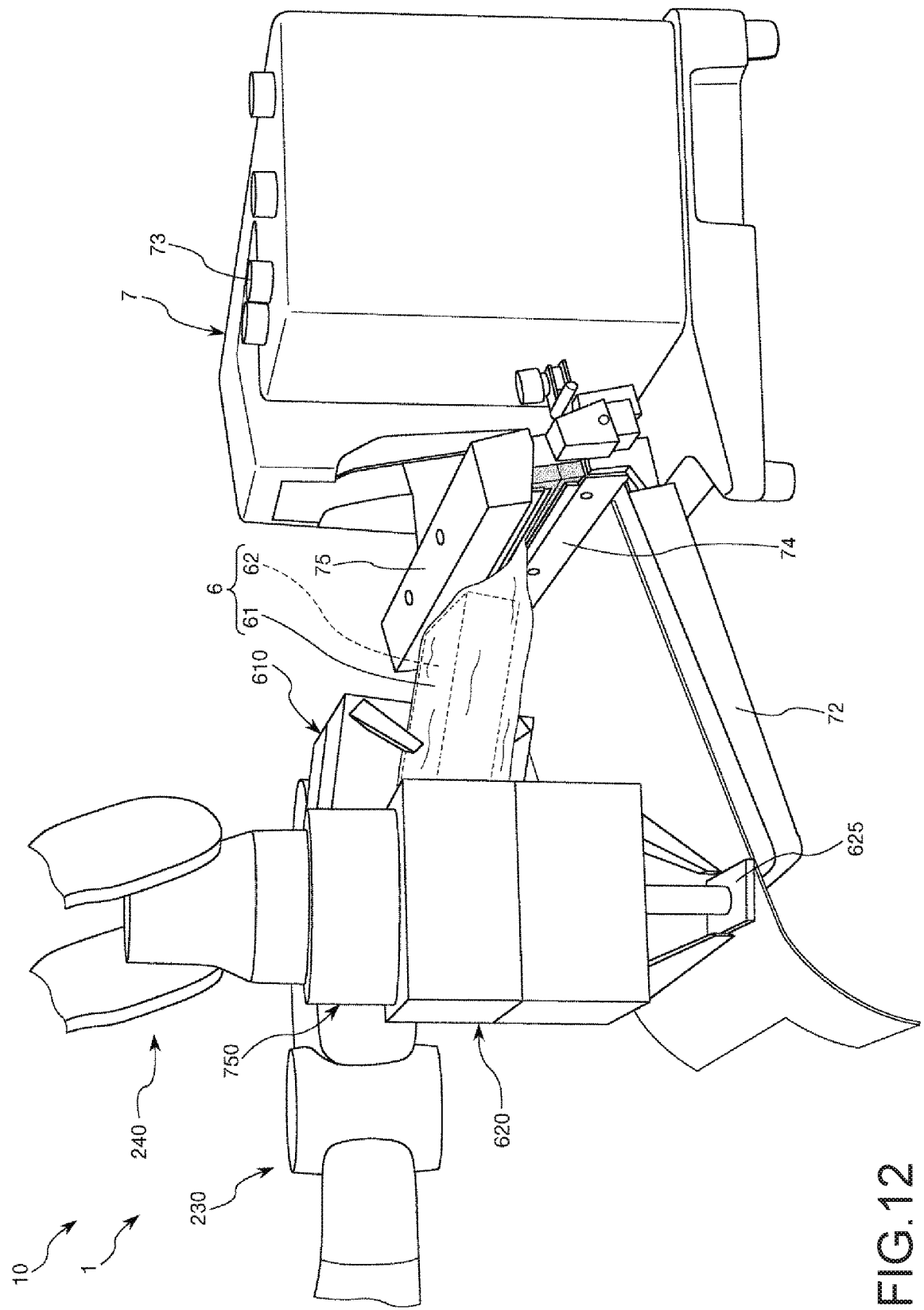
FIG. 12 is a diagram for explanation of the operation of the robot of the robot system shown in FIG. 1.

Then, as shown in FIG. 12, the plate 72 is pushed below and moved below by the multi-joint arm 240 (step S105). At step S105, the plate 72 is pushed further below than that at step S103. The operation of pushing the plate 72 below is controlled by the force trigger control and the position control. In the force trigger control, when a preset force (target force) is detected by the force sensor 750, the operation of the multi-joint arm 240 is stopped. Then, the multi-joint arm 240 moves to the next operation.

In the vacuum packaging apparatus 7, when the plate 72 moves below, the sealing member 74 moves below with the plate 72. Further, the sealing member 75 moves below by an amount of movement larger than the amount of movement of the sealing member 74, and thereby, the bag 61 is nipped by the sealing member 74 and the sealing member 75. Further, in this regard, the object 6 is subjected to forces from the sealing members 74, 75 and moves forward and backward, upward and downward, or the like. Furthermore, when the plate 72 moves further below than that at step S103, the parts of the sealing members 74, 75 for sealing the bag 61 are heated, and the bag 61 is fused by the heat and sealed.

At step S105, the multi-joint arm 230 is allowed to trace the motion of the object 6 (sealing members 74, 75) (step S105). The operation of allowing the multi-joint arm 230 to trace the motion of the bag 61 is controlled by the impedance control, not the position control. Thereby, the operation may be easily and appropriately performed. Note that, in the embodiment, at step S105, the impedance control is performed after the start and before the end of the movement of the multi-joint arm 240, i.e., in the entire of the period T2 in which the multi-joint arm 240 is moved, however, may be performed in a part of the period T2.

In the above described manner, the vacuum packaging of the object 6 is completed.

As described above, according to the robot system 10, the vacuum packaging work may be easily, quickly, and accurately performed. Further, compared to the case of a robot that operates both of two multi-joint arms by position control, teaching of the robot 1 may be easily and quickly performed.

It is not necessary to separately prepare a vacuum packaging apparatus for exclusive use of the robot 1 and the ordinary vacuum packaging apparatus 7 for human use may be used, and thereby, the convenience is high.

As above, the control apparatus, robot, and robot system according to the invention are explained with reference to the illustrated embodiments, however, the invention is not limited to those. The configurations of the respective parts may be replaced by arbitrary configurations having the same functions. Further, other arbitrary configurations may be added thereto.

In the above described embodiments, the vacuum packaging work (packaging work) is taken as the example of the work performed by the robot and the vacuum packaging apparatus (packaging apparatus) is taken as the example of the apparatus operated by the robot, however, the invention is not limited to those. That is, the work performed by the robot includes e.g. various works performed using the first robot arm and the second robot arm in cooperation or synchronization. Further, the apparatus operated by the robot includes e.g. various apparatuses used for the respective work. Note that a specific example of the other works of the vacuum packaging work includes an insertion work of inserting a first object into an insertion portion of a second object having the insertion portion and press work. Here, "insertion" is used in a broad concept containing fitting, screwing, joining, coupling, etc. Therefore, depending on the configuration of the insertion portion, "insertion" may be read as "joining", "coupling", or the like.

In the above described embodiments, the movable robot is explained, however, the invention is not limited to that. For example, the robot may be fixed to a predetermined part. As specific examples, the robot may be fixed to a floor of the installation space, ceiling, wall, worktable, ground, or the like using e.g. bolts or the like.

Further, in the invention, the robot may be placed within a cell.

In the above described embodiments, the number of rotation axes of the robot is 15, however, the invention is not limited to that. The number of rotation axes of the robot may be equal to or smaller than 14 or equal to or larger than 16.

Further, in the above described embodiments, the number of robot arms (multi-joint arms) of the robot is two, however, the invention is not limited to that. The number of robot arms may be equal to or larger than three. Or, a plurality of (e.g. two) robots with single arms may be provided. Or, a plurality of (e.g. two) robots with two or more (e.g. two) arms may be provided.

In the invention, the robot may be another form of robot. Specific examples include e.g. a legged walking (running) robot having leg parts and a horizontal articulated robot such as a scalar robot.

The entire disclosure of Japanese Patent Application No. 2016-207550, filed Oct. 24, 2016 is expressly incorporated by reference herein.

What is claimed is:

1. A control apparatus that controls a first robot arm provided with a first force detection part and a second robot arm provided with a second force detection part, comprising:
 a processor that is configured to
 using force trigger control, move the first robot arm until a target force is detected by the first force detection part, and
 at a same time that the first robot arm is moved using force trigger control and without using impedance control to move the first robot arm, perform impedance control on the second robot arm based on output of the second force detection part, without using force trigger control, in at least a part of a movement period in which the first robot arm is moved and before the first arm is stopped in response to the target force being detected.

2. The control apparatus according to claim 1, wherein the processor is configured to perform the impedance control in an entirety of the movement period.

3. The control apparatus according to claim 1, wherein the processor is configured to perform control of moving the first robot arm to operate an apparatus using the first robot arm, and performs the impedance control with an object grasped by the second robot arm.

4. The control apparatus according to claim 1, wherein the processor is configured to control a robot having the first robot arm and the second robot arm.

5. The control apparatus according to claim 1, wherein the processor is configured to perform vacuum packaging work by cooperatively operating the first robot arm and the second robot arm.

6. A robot comprising a first robot arm provided with a first force detection part and a second robot arm provided with a second force detection part, and controlled by the control apparatus according to claim 1.

7. A robot system comprising:
the control apparatus according to claim 1; and
the first robot arm provided with the first force detection part and the second robot arm provided with the second force detection part controlled by the control apparatus.

8. A control apparatus that controls a first robot arm provided with a first force detection part and a second robot arm provided with a second force detection part, comprising;
a controller configured to
using impedance control, move the first robot arm until a target force is detected by the first force detection part, and
at a same time that the first robot arm is moved using force trigger control and without using impedance control to move the first robot arm, perform impedance control on the second robot arm based on output of the second force detection part, without using force trigger control, in at least a part of a movement period in which the first robot arm is moved and before the first arm is stopped in response to the target force being detected.

* * * * *